US007965436B2

United States Patent
Sigalas et al.

(10) Patent No.: US 7,965,436 B2
(45) Date of Patent: Jun. 21, 2011

(54) MICRON-SIZE OPTICAL FARADAY ROTATOR

(75) Inventors: Mihali Sigalas, Santa Clara, CA (US); Shih-Yuan Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 713 days.

(21) Appl. No.: 11/796,182

(22) Filed: Apr. 26, 2007

(65) Prior Publication Data

US 2008/0266644 A1    Oct. 30, 2008

(51) Int. Cl.
*G02F 1/09* (2006.01)
*G02B 26/00* (2006.01)
(52) U.S. Cl. .......... 359/282; 359/237
(58) Field of Classification Search .......... 359/280–281, 359/283, 237–239, 259, 296; 345/84–85, 345/107; 430/31–38; 347/111–112; 399/131; 204/600
See application file for complete search history.

(56) References Cited

U.S. PATENT DOCUMENTS

| 6,631,236 B2 * | 10/2003 | Yamada ............ 385/129 |
| 6,952,300 B2 | 10/2005 | Levy |
| 7,164,823 B2 | 1/2007 | Lee et al. |
| 2002/0149832 A1 | 10/2002 | Matsushita et al. |
| 2002/0154403 A1 | 10/2002 | Trotter, Jr. |
| 2003/0147579 A1* | 8/2003 | Hammer ............ 385/11 |
| 2003/0223721 A1* | 12/2003 | Povinelli et al. ...... 385/129 |
| 2005/0089258 A1 | 4/2005 | Kim et al. |
| 2005/0201654 A1* | 9/2005 | Ellwood, Jr. ........ 385/6 |
| 2006/0013076 A1 | 1/2006 | Kishimoto et al. |
| 2008/0219628 A1* | 9/2008 | Podolskiy et al. ...... 385/123 |

OTHER PUBLICATIONS

Levy, et al.; Flat-Top Response in One-Dimensional Magnetic Photonic Bandgap Structures with Faraday Rotation Enhancement; Journal of Lightwave Technology, vol. 19, No. 12, Dec. 2001.
Shoji, et al.; Ultracompact Optical Isolator with a Silicon High Index Contrast Waveguide; Dept. of Electrical and Elctronic Engineering; 2003 Optical Society of America.

* cited by examiner

*Primary Examiner* — Dawayne A Pinkney

(57) ABSTRACT

In an embodiment, micron-size optical Faraday rotator includes a non-magnetic dielectric waveguide. The waveguide includes a plurality of perforations to form a photonic crystal. A magnetic cladding is disposed on at least one side of the waveguide. The Faraday rotator causes non-reciprocal Faraday rotation of an optical signal propagating within the waveguide.

18 Claims, 3 Drawing Sheets

MICRON-SIZE OPTICAL FARADAY ROTATOR

BACKGROUND

As the usage of optical components and systems has advanced there is an increasing desire to produce integrated optical systems. One component used in optical systems is an isolator, which permits transmission of light in only one direction. Optical isolators are useful, for example, to help avoid reflected light from returning back to a source (e.g., a laser). Optical isolators are typically bulky components, however, having sizes on the order of millimeters, making it difficult to include them within an integrated optical system.

One way of constructing an isolator is to place a Faraday rotator between two polarizers having differing axes of polarization (typically 45 degrees). The Faraday rotator produces gradual rotation of the polarization angle of an electromagnetic wave (e.g., light) propagating through the device. Light traveling in one direction passes through the first polarizer and is rotated into alignment with the second polarizer. The rotation is non-reciprocal, however, so that light traveling in the opposite direction is polarized by the second polarizer and rotated so that it is orthogonal to the first polarizer and thus does not pass through.

Magnetic materials having a high Verdet constant, such as cerium-substituted yttrium iron garnet (Ce:YIG) or bismuth-substituted YIG (Bi:YIG) can be used as the Faraday rotator, as such materials can provide a relative large amount of rotation (e.g., 45 degrees for several 100 micrometers of thickness) while retaining good optical transmission. Unfortunately, even these types of devices are larger than desired.

Devices have been constructed that form magnetic photonic crystals by stacking together very thin layers of alternating materials types (e.g., magnetic YIG and non-magnetic gadolinium gallium garnet (GGG)). The magnetic photonic crystal slows the light, providing a longer effective optical length, allowing a reduced length of material to provide the same amount of Faraday rotation. Growth and shaping of the YIG and GGG materials is not easily performed in situ, however, so fabrication of the photonic crystal structure can be difficult and not easily performed in an integrated optical system.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

DETAILED DESCRIPTION OF EXAMPLE EMBODIMENTS

In describing embodiments of the present invention, the following terminology will be used.

The singular forms "a," "an," and "the" include plural referents unless the context clearly dictates otherwise. Thus, for example, reference to "a hole" includes reference to one or more of such holes.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art.

Reference will now be made to the exemplary embodiments illustrated, and specific language will be used herein to describe the same. It will nevertheless be understood that no limitation of the scope of the invention is thereby intended.

It has been recognized by the present inventors that there is a need for a small, micron-size optical Faraday rotator which can be easily fabricated in an integrated optical system. Such a Faraday rotator may prove useful, for example, for making optical isolators. In accordance with embodiments of the present invention, a micron-size optical Faraday rotator can include a waveguide which is formed in a non-magnetic dielectric material. The dielectric material can be easily fabricated, for example using conventional semiconductor processing steps.

Figure 1:
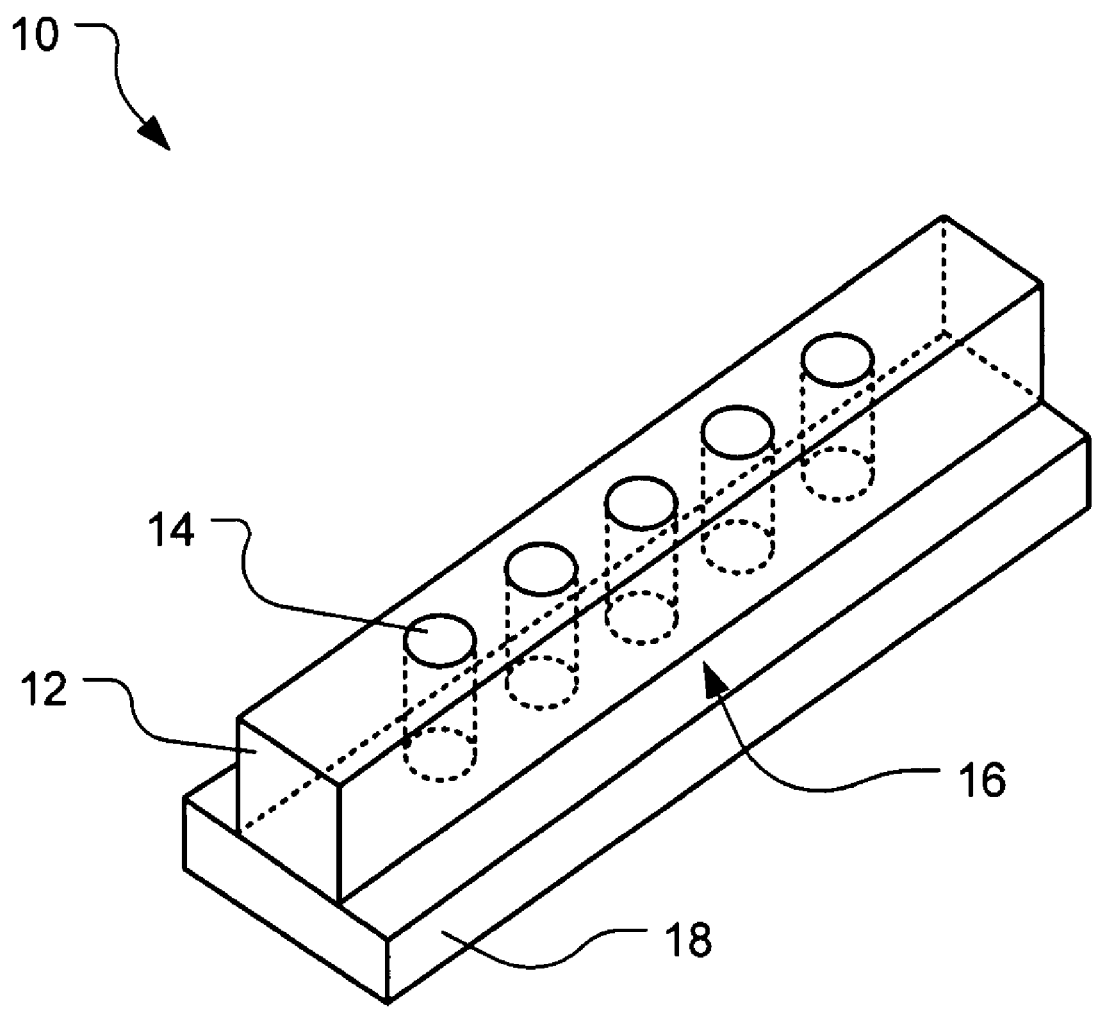
FIG. 1 is a perspective view illustration of a Faraday rotator in accordance with an embodiment of the present invention.

One exemplary embodiment of the present invention is a micron-size optical Faraday rotator as illustrated in perspective view in FIG. 1. The rotator, shown generally at 10, includes a non-magnetic dielectric waveguide 12. The non-magnetic dielectric waveguide include a plurality of perforations, for example holes 14. The perforations are positioned to form a photonic crystal 16. For example, the perforations may be centered on a longitudinal axis of the non-magnetic dielectric waveguide, as illustrated here. The perforations may have a diameter between about 50 nanometers and about 100 nanometers, and may be spaced at intervals between about 200 nanometers and about 800 nanometers for form a photonic crystal. For example, the perforations may be regular space or may be irregularly spaced. With these dimensions, the photonic crystal has a photonic band gap within the infrared range, and the group velocity of light at frequencies near the edge of the band gap becomes quite small. This increases the effective optical path length.

A magnetic cladding 18 is disposed on at least one side of the non-magnetic dielectric waveguide 12. The magnetic cladding has a refractive index less than that of the non-magnetic dielectric waveguide, helping to localize the optical signal within the waveguide. The magnetic cladding imposes a magnetic field within the non-magnetic dielectric waveguide, causing non-reciprocal Faraday rotation of an optical signal propagating within the waveguide. Because the photonic crystal 16 has the effect of lengthening the optical path length of the waveguide, the magnetic cladding causes an increased amount of Faraday rotation within the waveguide as compared to a non-perforated waveguide.

For example, the rotator 10 may result in rotation of about 22.5 degrees per micrometer, or a total rotation of 45 degrees for a waveguide of about 2 micrometers in length for an optical signal having a free-space wavelength within the range of about 1 micrometer to about 1.5 micrometers. Actual amounts of rotation will vary depending on the materials used to construct the rotator 10, the optical frequency, etc. Accordingly, the rotator can achieve a small size, on the order of a few microns in length, or smaller. This small size increases the compatibility of the rotator with integrated optical systems.

The non-magnetic dielectric waveguide 12 can be relatively thin to enable the magnetic cladding 18 to have a strong influence on the optical signal propagating within the non-magnetic dielectric waveguide. For example, the non-magnetic dielectric waveguide may have a thickness between about 50 nanometers and about 400 nanometers in the direction perpendicular to the magnetic coating. It will be appreciated that the refractive index of the waveguide is generally higher than that of the cladding.

The waveguide 12 may be formed of a material which is substantially transparent at the desired optical frequency. For example, for infrared optical signals, silicon, germanium, gallium arsenide, indium phosphide, gallium nitride, and the like are suitable materials.

As shown in FIG. 1, the magnetic cladding 18 can be in the form of a substrate, on which the waveguide 14 is disposed. For example, the magnetic cladding may comprise a polished crystal of cerium-substituted yttrium iron garnet (Ce:YIG) or bismuth-substituted YIG (Bi:YIG). Other materials that may be used for the magnetic cladding include terbium gallium garnets and gallium arsenide having nanoclusters formed of manganese arsenide.

Figure 2:
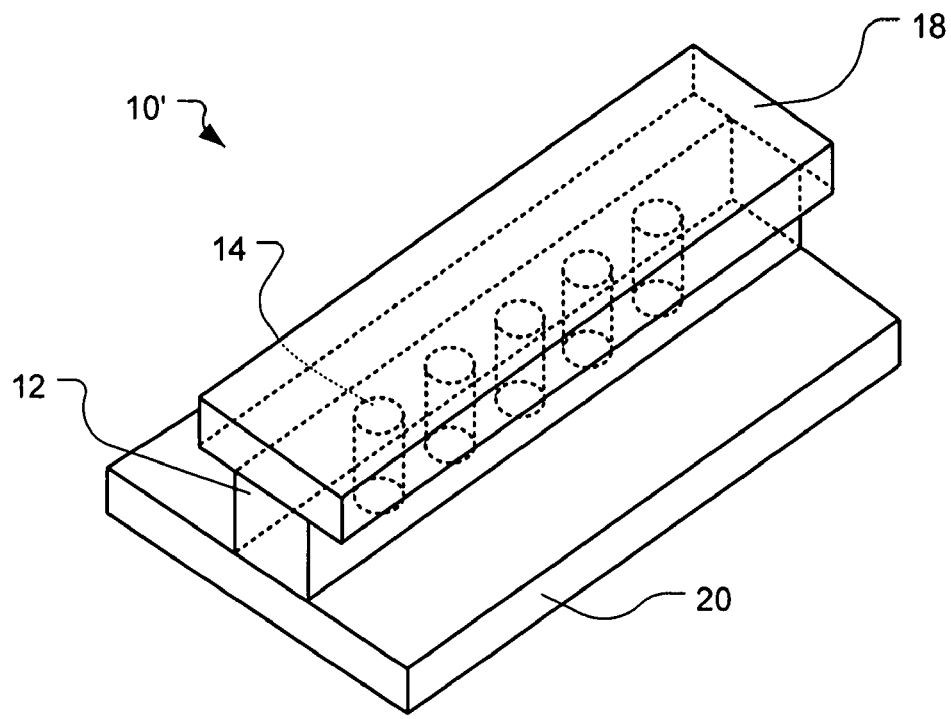
FIG. 2 is a perspective view illustration of a Faraday rotator in accordance with another embodiment of the present invention.

An alternate arrangement of a Faraday rotator 10' is illustrated in FIG. 2. The rotator is constructed on a substrate 20, on which a non-magnetic dielectric waveguide 12 having a plurality of perforations 14 is disposed. A magnetic cladding 18 in the form of a layer of magnetic material is disposed on top of the waveguide.

Figure 3:
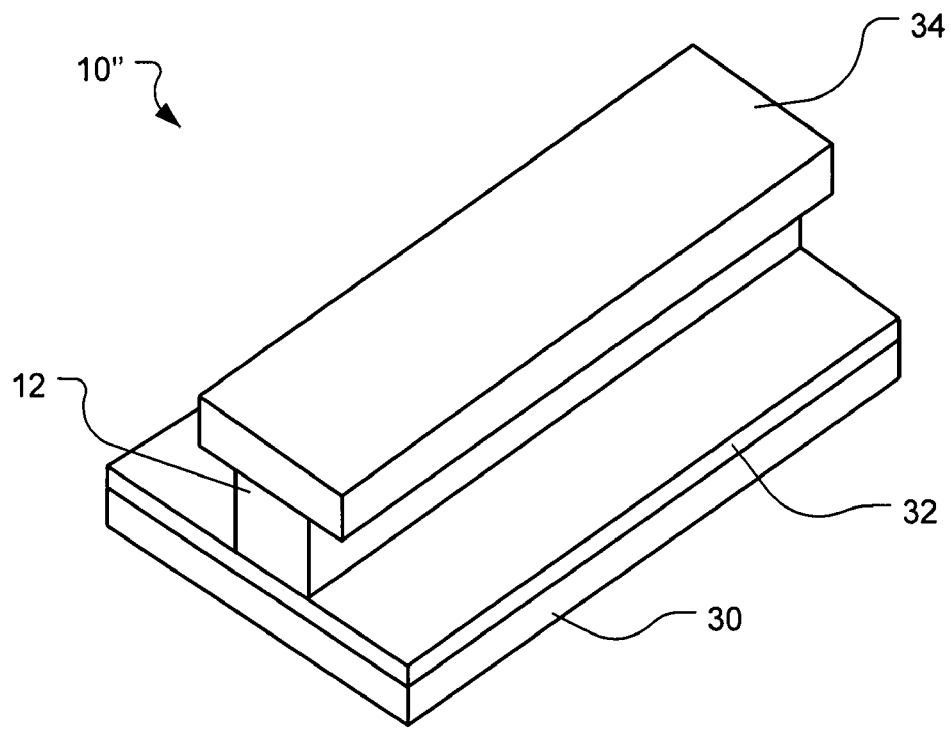
FIG. 3 is a perspective view illustration of a Faraday rotator in accordance with yet another embodiment of the present invention.

Another alternate arrangement of a Faraday rotator 10" is illustrated in FIG. 3. The rotator is constructed on a substrate 30, on which a magnetic layer 32 is disposed. Positioned on top of the magnetic layer is a non-magnetic dielectric waveguide 12, so that the magnetic layer provides a cladding on one side of the non-magnetic dielectric waveguide. If desired, an additional magnetic layer 34 can be positioned on top of the waveguide forming a cladding on a second side of the non-magnetic dielectric waveguide.

While the above examples of Faraday rotators have shown a single row of perforation along the waveguide, other arrangements of perforations can be used. For example, the waveguide may include multiple rows of perforations or other arrangements of perforations (e.g. a quasi-crystal) or even perforations in multiple-directions. The perforations may be positioned with periodic spacing, non-periodic spacing, or with a mixture of periodic and non-periodic spacing.

Figure 4:
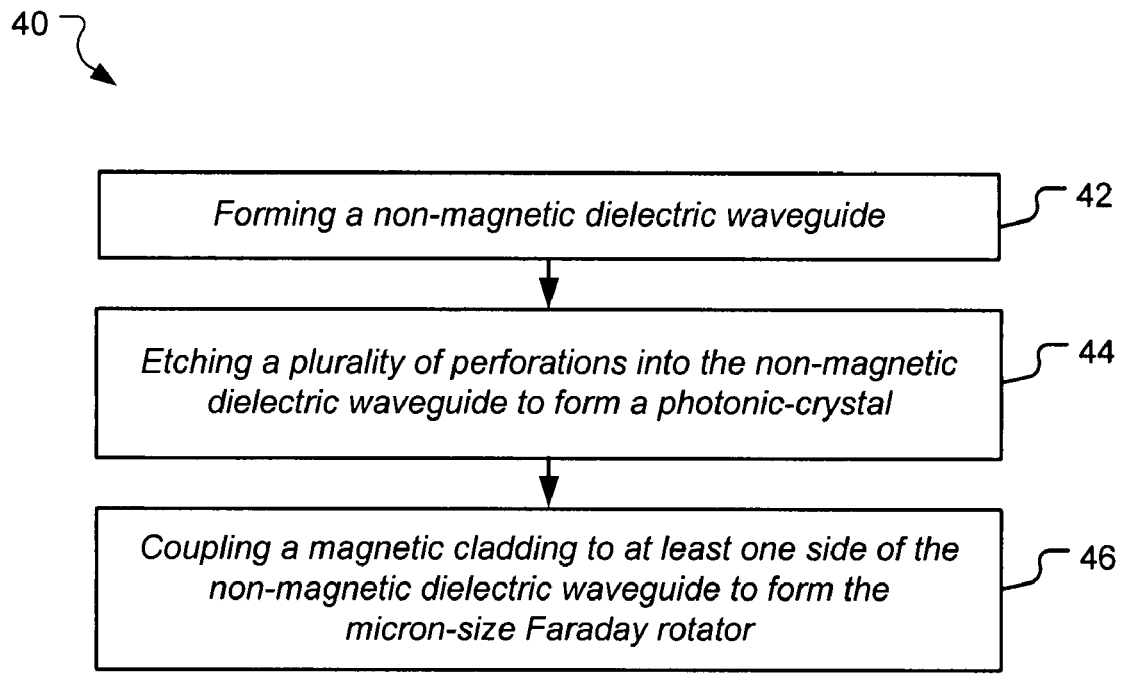
FIG. 4 is a flow chart of a method of making a Faraday rotator in accordance with an embodiment of the present invention.

Various ways of making a micron-size optical Faraday rotator will now be discussed. In one embodiment, a method of making a micron-size optical Faraday rotator is illustrated in flow chart form in FIG. 4. The method 40 may include forming 42 a non-magnetic dielectric waveguide. For example, the non-magnetic dielectric waveguide may be formed on a provided substrate. As a more particular example, the substrate may be semiconductor wafer (e.g. silicon, indium phosphide, or the like), a glass wafer, a polished magnetic or non-magnetic crystal, or the like. For example, the substrate may be a material compatible with the formation of other photonic devices, allowing the Faraday rotator to be formed in an integrated optical system. Forming the non-magnetic dielectric waveguide can include depositing a layer of non-magnetic dielectric material on the substrate and patterning the non-magnetic dielectric material to form the waveguide. As noted above, various non-magnetic dielectric materials may be used, including for example silicon.

In general, depositing materials can be performed by any process that grows, coats, or otherwise transfers a material onto the substrate. For example depositing materials can be performed by spin coating, physical vapor deposition (PVD), chemical vapor deposition (CVD), electrochemical deposition (ECD), molecular beam epitaxy (MBE), atomic layer deposition (ALD), sputtering, and similar processes.

Patterning can be performed by lithographic processes. For example, a layer of material can be deposited, a photoresist layer applied and exposed through a mask, exposed (positive photoresist) or unexposed (negative photoresist) portions of the photoresist washed away by a developer solution to reveal portions of the material layer, and the revealed portions of the material removed using etching or other processing. Etching can be performed, for example, by wet etching or dry etching, such as reactive ion etch (RIE).

Another step of the method 40 can include etching 44 a plurality of perforations into the non-magnetic dielectric waveguide to form a photonic crystal. For example, the perforations can be formed using lithography. A wide variety of materials can be used for the dielectric material, since it need not be magnetic. Accordingly, a material that is relatively easy to use and process, such as silicon, can be used simplifying fabrication of the Faraday rotator as compared to the formation of a magnetic photonic crystal.

The method 40 can also include coupling 46 a magnetic cladding to at least one side of the non-magnetic dielectric waveguide to form the micron-size Faraday rotator. Various ways of coupling the magnetic cladding to the side of the non-magnetic dielectric waveguide are possible.

For example, the substrate may be a magnetic material and the non-magnetic dielectric waveguide formed thereon. As yet another example, the substrate may have a magnetic material bonded to the substrate or deposited on the substrate, and the non-magnetic dielectric waveguide formed on top of the magnetic material. The magnetic material may be applied after the waveguide is formed, for example by deposition and patterning of the magnetic layer after the waveguide is formed.

Formation of magnetic materials, such as YIG, is often performed using liquid phase epitaxy at high temperatures, however, which may be incompatible with some substrate types or the non-magnetic dielectric material used for the waveguide. If desired, the magnetic cladding may be formed separately, and applied to the non-magnetic dielectric waveguide after being formed. For example, a YIG crystal can be sliced and polished to form layers. A layer of preformed magnetic material can be bonded to the top or bottom of the non-magnetic dielectric waveguide. Since the magnetic cladding is not formed as a photonic crystal, fabrication of complex structures in the magnetic cladding is not necessary. The magnetic cladding may be formed as a permanent magnet, for example by RF sputtering or annealing in the presence of a magnetic field. Alternately, a magnetic field may be applied to the magnetic material via a permanent magnet temporarily or permanently positioned adjacent to the magnetic cladding. For example, a film of conventional metallic magnetic material such as iron, nickel, copper-iron alloys, or the like may be placed along the magnetic cladding on a side opposite the non-magnetic dielectric waveguide. Positioning metallic materials directly adjacent to the waveguide may adversely impact the properties of the photonic crystal.

Figure 5:
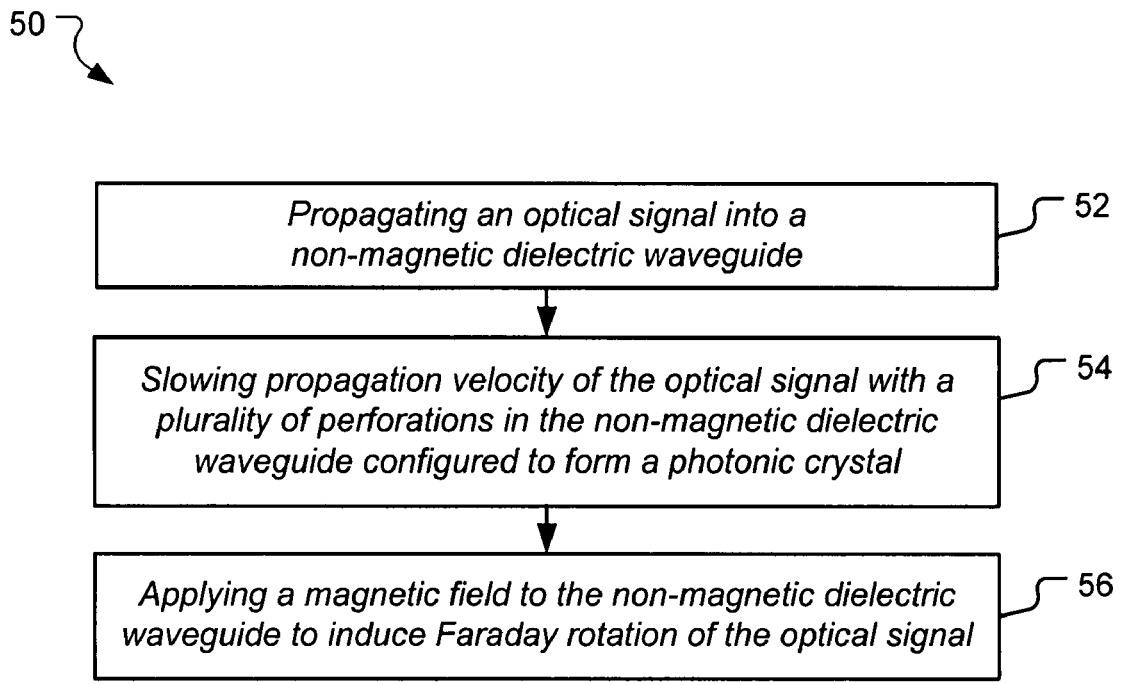
FIG. 5 is a flow chart of a method of producing Faraday rotation in an optical signal in accordance with an embodiment of the present invention.

Finally, a method of producing Faraday rotation of an optical signal is shown in flow chart form in FIG. 5. The method may include propagating 52 an optical signal into a non-magnetic dielectric waveguide. For example, the optical signal may be an infrared or visible wavelength electromagnetic wave. The optical signal may be propagating into the waveguide by a laser or other optical system components. The waveguide may be, for example, part of an integrated optical system. The method can include slowing 54 propagation velocity of the optical signal with a plurality of perforations in the non-magnetic dielectric waveguide configured to form a photonic crystal. For example, the perforations can be configured as described above. The method can also include applying 56 a magnetic field to the non-magnetic dielectric waveguide to induce Faraday rotation of the optical signal, for example as described above.

Summarizing and reiterating to some extent, a Faraday rotator in accordance with embodiments of the present invention can provide non-reciprocal rotation of optical signals using relatively small (micron-size) structures. A photonic-crystal is formed in a waveguide by a plurality of perforations. The photonic-crystal slows the propagation of the optical signal, allowing a long effective optical path length through the photonic-crystal. The waveguide and perforations can be formed in a wide variety of materials making it easier to fabricate than a magnetic photonic crystal. The Faraday rotator can thus be used for isolators and other optical structures within an integrated optical system.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A micron-size optical Faraday rotator, comprising:
a non-magnetic dielectric waveguide having a plurality of perforations to form a photonic crystal; and
a planar magnetic cladding having a static magnetic field disposed on at least one side of the non-magnetic dielectric waveguide to cause non-reciprocal Faraday rotation of an optical signal propagating within the non-magnetic dielectric waveguide.

2. The device of claim 1, wherein the magnetic cladding comprises a substrate on which the non-magnetic dielectric waveguide is disposed.

3. The device of claim 1, wherein the magnetic cladding comprises a layer disposed on top of the non-magnetic dielectric waveguide.

4. The device of claim 1, wherein the non-magnetic dielectric waveguide has a thickness of between about 50 nanometers and about 400 nanometers in a direction perpendicular to the magnetic cladding.

5. The device of claim 1, wherein the perforations have a diameter between about 50 nanometers and about 100 nanometers.

6. The device of claim 1, wherein the perforations are periodically spaced along a length of the non-magnetic dielectric waveguide at intervals of between about 200 nanometers and about 800 nanometers.

7. The device of claim 1, wherein the perforations are centered on a longitudinal axis of the non-magnetic dielectric waveguide.

8. The device of claim 1, wherein the non-magnetic dielectric waveguide comprises silicon.

9. The device of claim 1, wherein the magnetic cladding comprises cerium-substituted yttrium iron garnet.

10. The device of claim 1, wherein the waveguide is about 2.0 micrometers in length and the resulting Faraday rotation is about 45 degrees for a wavelength of the optical signal within the range of about 1.0 micrometers to about 1.5 micrometers.

11. A method of making a micron-size optical Faraday rotator, comprising:
forming a non-magnetic dielectric waveguide;
etching a plurality of perforations into the non-magnetic dielectric waveguide to form a photonic-crystal; and
coupling a planar magnetic cladding having a static magnetic field to at least one side of the non-magnetic dielectric waveguide to cause non-reciprocal Faraday rotation of an optical signal propagating within the non-magnetic dielectric waveguide to form the micron-size Faraday rotator.

12. The method of claim 11, wherein forming a non-magnetic dielectric waveguide comprises:
depositing a non-magnetic dielectric material on a substrate; and
patterning the non-magnetic dielectric material to form the waveguide.

13. The method of claim 12, wherein the substrate is a magnetic material.

14. The method of claim 11, wherein etching a plurality of perforations is performed using lithography.

15. The method of claim 11, wherein coupling a magnetic cladding to at least one side of the non-magnetic dielectric waveguide comprises providing a magnetic substrate on which the non-magnetic dielectric waveguide is formed.

16. The method of claim 11, wherein coupling a magnetic cladding comprises placing a layer of magnetic material on top of the non-magnetic dielectric waveguide.

17. A method of producing Faraday rotation of an optical signal, comprising:
propagating an optical signal into a non-magnetic dielectric waveguide;
slowing propagation velocity of the optical signal with a plurality of perforations in the non-magnetic dielectric waveguide configured to form a photonic crystal; and
applying a static magnetic field to the non-magnetic dielectric waveguide with a planar magnetic layer to induce Faraday rotation of the optical signal.

18. The method of claim 17, wherein the optical signal undergoes a rotation of about 22.5 degrees per micrometer for a wavelength of the optical signal within the range of about 1.0 micrometers to about 1.5 micrometers.

* * * * *